United States Patent
Brauneis et al.

(10) Patent No.: US 7,480,895 B2
(45) Date of Patent: Jan. 20, 2009

(54) WEB APPLICATION DEVELOPMENT TOOL

(75) Inventors: David N. Brauneis, Raleigh, NC (US);
Christopher C. Mitchell, Raleigh, NC (US); Brent H. Daniel, Morrisville, NC (US); Richard A. Backhouse, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 1032 days.

(21) Appl. No.: 10/721,818

(22) Filed: Nov. 24, 2003

(65) Prior Publication Data

US 2005/0114630 A1    May 26, 2005

(51) Int. Cl.
G06F 9/44    (2006.01)
G06F 15/16   (2006.01)

(52) U.S. Cl. .................................. 717/120; 709/201
(58) Field of Classification Search ................ 717/120
See application file for complete search history.

(56) References Cited

U.S. PATENT DOCUMENTS

| | | | | |
|---|---|---|---|---|
| 5,047,918 A * | 9/1991 | Schwartz et al. | ............ | 707/203 |
| 5,966,702 A * | 10/1999 | Fresko et al. | ................ | 707/1 |
| 6,230,184 B1 * | 5/2001 | White et al. | ................ | 709/201 |
| 6,336,122 B1 * | 1/2002 | Lee et al. | .................... | 707/204 |
| 6,493,870 B1 * | 12/2002 | Madany et al. | .............. | 717/165 |
| 6,675,382 B1 * | 1/2004 | Foster | ........................ | 717/177 |
| 6,901,590 B2 * | 5/2005 | Narayanaswamy et al. | . | 717/177 |
| 6,976,093 B2 * | 12/2005 | Lara et al. | .................... | 709/248 |
| 7,069,553 B2 * | 6/2006 | Narayanaswamy et al. | . | 717/173 |
| 7,165,249 B2 * | 1/2007 | Potter et al. | ................. | 717/174 |
| 7,171,422 B2 * | 1/2007 | Hayes et al. | ................ | 707/102 |
| 7,197,519 B2 * | 3/2007 | Nishikawa et al. | .......... | 707/202 |
| 7,210,124 B2 * | 4/2007 | Chan | .......................... | 717/120 |
| 2002/0178439 A1 * | 11/2002 | Rich et al. | ................... | 717/174 |
| 2002/0184187 A1 | 12/2002 | Bakalash et al. | | |
| 2003/0018642 A1 | 1/2003 | Bakalash et al. | | |
| 2003/0033360 A1 | 2/2003 | Garnett et al. | | |
| 2003/0050967 A1 | 3/2003 | Bentley | | |
| 2003/0061191 A1 * | 3/2003 | Pearson | ........................ | 707/1 |
| 2003/0093471 A1 * | 5/2003 | Upton | ........................ | 709/203 |
| 2003/0182651 A1 * | 9/2003 | Secrist et al. | ................ | 717/120 |
| 2005/0108259 A1 * | 5/2005 | Watanabe et al. | ........... | 707/100 |

OTHER PUBLICATIONS

Chan, Allen; "J2EE Application Deployment Considerations", Jun. 11, 2003, p. 1-8, retrieved from scholar.google.com on Oct. 2, 2007.*

* cited by examiner

*Primary Examiner*—Wei Y. Zhen
*Assistant Examiner*—Chih-Ching Chow
(74) *Attorney, Agent, or Firm*—Duke W. Yee; A. Bruce Clay; Rudolf Siegesmund

(57) ABSTRACT

A computer implemented method is provided to increase the efficiency of the development of JAVA™ Enterprise Edition (J2EE™) applications. A project may be divided into modules which may be developed by independent teams. The files within each module are classified as independent of resources in other modules or dependent. Independent files may be packaged into a single, integrated web application archive (WAR) file without further processing. Corresponding dependent files are compared and any conflicts are resolved. The resulting files may then be packaged into the WAR file.

1 Claim, 2 Drawing Sheets

WEB APPLICATION DEVELOPMENT TOOL

TECHNICAL FIELD

The present invention relates generally to the development of web applications and, in particular, to merging independently developed modules into an integrated web application.

BACKGROUND ART

Large software projects are frequently divided into separate components to be completed by independent development teams. For example, in JAVA™ Enterprise Edition (J2EE) (JAVA™ and J2EE™ are trademarks of Sun Microsystems, Inc., Santa Clara, Calif.) projects, applications are typically divided into a presentation or user interface component, a business logic component and a data component, each completed by an independent development team. Separating the development of an application in this manner reduces the complexity of development by isolating each team from the effects of changes in other parts of the project implemented by other teams.

However, such a division of development effort may still be subject to unnecessary complexity in very large projects. Upon completion of the J2EE™ components, the presentation and business components are generally combined into a single archive (WAR) file. Although the two components could be packaged into multiple WAR files, separate packaging is not preferable because each WAR file has its own configuration data and/or runtime resources. Thus, WAR files will not be able to share resources, such as a context root (configuration data) or a session (runtime resource), with other WAR files.

Consequently, a need exists to independently develop the separate components of a project while integrating the components into a single logical component at runtime.

SUMMARY OF THE INVENTION

The present invention provides a computer implemented method to increase the efficiency of the development of JAVA™ Enterprise Edition (J2EE™) applications. A project may be divided into modules which may be developed by independent teams. The files within each module are classified as independent of resources in other modules or dependent. Independent files may be packaged into a single, integrated web application archive (WAR) file without further processing. Corresponding dependent files are compared and any conflicts are resolved. The resulting files may then be packaged into the WAR file.

Changes made to a module during development may be process and tested against modules previously integrated into the WAR file.

Similarly, subsequent revisions to a module may be incorporated into the WAR file after first being processed to resolve any conflicts with files in the existing modules.

DETAILED DESCRIPTION OF THE PREFERRED EMBODIMENT

Figure 1:
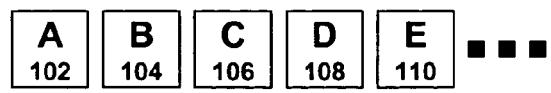
FIG. 1 is a representation of files available for an exemplary J2EE™ development project.
Figure 2:
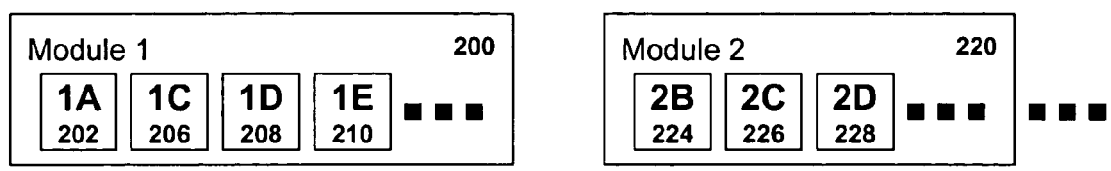
FIG. 2 is a representation of the files of FIG. 1 incorporated into independently developed modules.

FIG. 1 is a representation of some of the resources, such as files File A 102, File B 104, File C 106, File D 108 and File E 110, which are available for an exemplary J2EE™ development project; it will be appreciated that many additional resources are typically present in a project. The project is divided into modules to be developed independently by different teams. Two such modules 200 and 220 are illustrated in FIG. 2; it will be appreciated that many additional modules are typically present in a project. The development team of the first module 200 has incorporated copies of some of the files: A 102, C 106, D 108 and E 110; the copies have been designated files 1A 202, 1C 206, 1D 208 and 1E 210. The development team of the second module 220 has also incorporated copies of files C 106 and D 108 as well as copies of file B 104; these copies have been designated files 2B 204, 20 206 and 2D 208.

Figure 3:
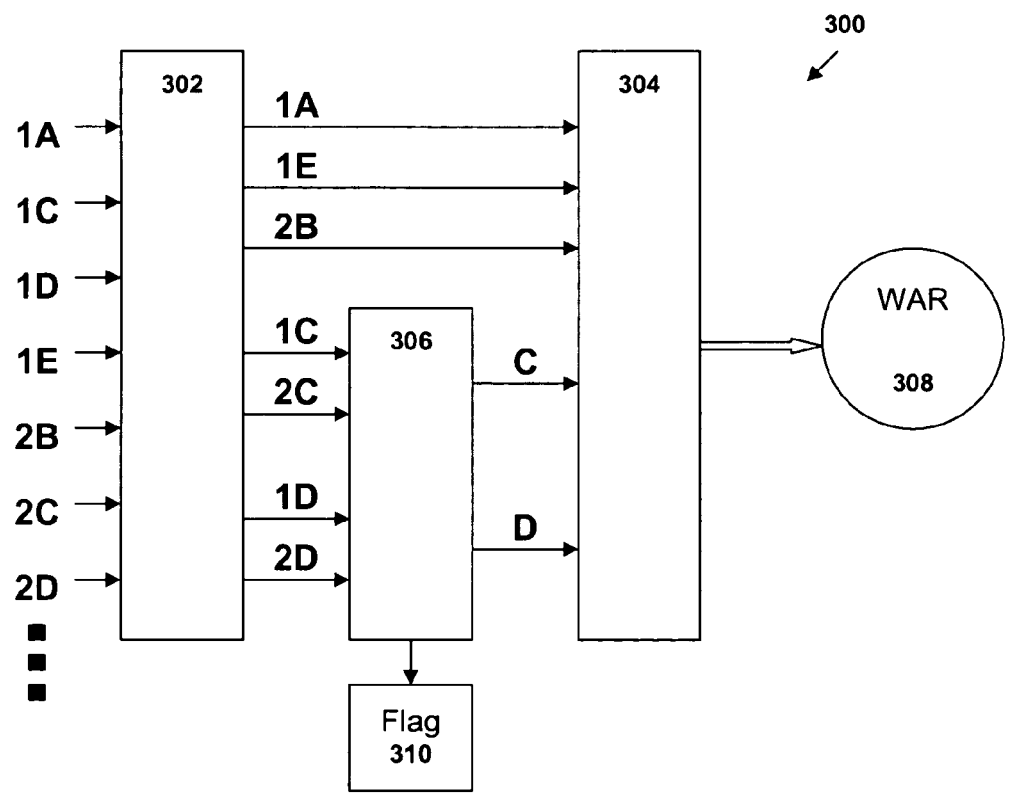
FIG. 3 is a block diagram of the merge tool of the present invention.
Figure 4:
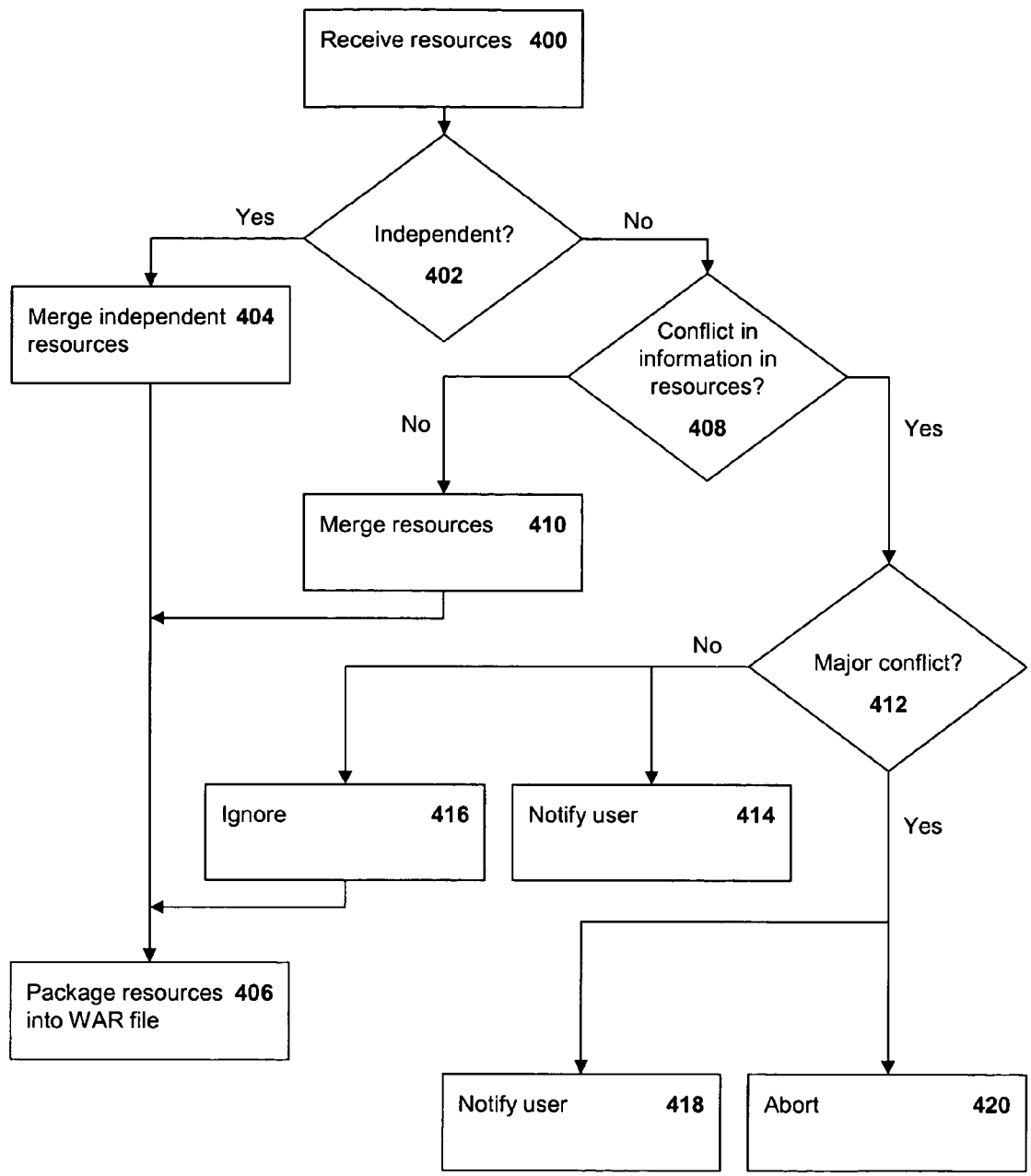
FIG. 4 is a flow chart of the merge process of the present invention.

Referring to the block diagram of FIG. 3 and the flow chart of FIG. 4, after the teams have completed their modules, all of the resources (files 1A, 1C, 1D, 1E, 2B, 2C and 2D) are received in a first section 302 of the merge tool 300 of the present invention (step 400). In the first section 302 the resources of each module are examined to determine which are independent and do not correspond to any resource in a different module (step 402). An example of an independent file might include an XML file which defines validation constraints for a STRUTS framework. In FIGS. 2 and 3, files 1A 203 and 1E 210 are used only in the first module 200 while file 2B 202 is used only in the second module 220. Thus, these three files are independent. The independent files are processed by a second section 304 of the tool 300 (step 404) and packaged into the application's WAR file (step 406).

The remaining resources used in the first module 200 are each related to a corresponding resource in the second module: file 1C 206 is related to file 2C 226; file 1D 208 is related to file 2D 228. For example, a file to map error codes to error messages might be used in two modules.

In a third section 306 of the tool 300, the related files are compared (step 408). The information in two corresponding files (such as files 1C and 2C) is examined to determine if any conflicts exist between the two. If no conflicts are present, the two files are merged (step 410) and passed to the second section 304 to be packaged in the WAR file 308.

If a conflict in the information of two resources is identified, it must be determined whether the conflict is major or minor (step 412). If minor, a user may be notified with an appropriate message 310 (step 414), allowing the user to decide how to proceed. While less preferable, the information in one file may alternatively be ignored (step 416), displaced by the information in the other file.

If the conflict is irreconcilable and, therefore, major, the user may be notified with an error message 310 (step 418), allowing the user to decide how to proceed. Alternatively, the process may abort (step 420), giving the development groups an opportunity to resolve the conflict by revising one or both of the related modules.

After conflicts have been resolved, the merged files (files C and D in the example) are passed to the second section 304 of the tool 300 to be packaged in the WAR file 308 (step 406). The WAR file 308 is then ready to be installed into a J2EE™ application server as a J2EE™ application.

During development, a development team may want to make revisions to a file and determine if the revisions will perform as expected. The module in which the revisions were made may be processed by the tool 300 and tested against other modules already integrated into the WAR file 308.

Similarly, after development, revisions or updates to a file may be made. The module in which the revisions were made may be processed by the tool 300 and integrated into the WAR file 308.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A computer implemented method for packaging a web application archive file, comprising:

identifying a first plurality of resources and a second plurality of resources from a group of resources available for a development project;

identifying a related resource, wherein a related resource is a resource present in both the first plurality of resources and in the second plurality of resources;

identifying independent resources, wherein the independent resources are resources present only in the first plurality of resources and not in the second plurality of resources, and resources present only in the second plurality of resources and not in the first plurality of resources;

dividing the development project into a first module and a second module, wherein the first module is developed by a first development team and the second module is developed by a second development team independently of the first development team;

incorporating copies of the first plurality of resources into the first module;

incorporating copies of the second plurality of resources into the second module;

modifying a copy of the related resource in the first module such that information in the copy of the related resource in the first module conflicts with information in the copy of the related resource in the second module;

after completing development of the first module and the second module, creating a single web application archive file for use by both the first module and the second module, wherein the single web application archive file comprises:

the independent resources; and the related resource, wherein the related resource includes the information in the copy of the related resource in the first module that conflicts with the information in the copy of the related sources in the second module, but not the information in the copy of the related resource in the second module.

* * * * *